Reissued Nov. 23, 1943 Re. 22,393

UNITED STATES PATENT OFFICE 22,393

PROCESS OF PRODUCING WOOD PRESERVATIVES

Jacquelin E. Harvey, Jr., Washington, D. C., assignor of one-half to Southern Wood Preserving Company, East Point, Ga., a corporation of Georgia No Drawing. Original No. 2,291,329, dated July 28, 1942, Serial No. 345,446, July 13, 1940. Application for reissue April 26, 1943, Serial No. 484,671

12 Claims. (Cl. 196—53)

The invention relates to the production of wood preservatives by treatment of tars, such as coal tar, gas house tar, low temperature tar, water gas tar, blast furnace tar, lignite tar, wood tar, pine tar and oils, rosin, rosin oil, fractions and residues derived therefrom, including pitches, with hydrogen; high boiling aromatic extracts from petroleum and tars resulting from polymerization of petroleum or fractions thereof.

It is an object of the present invention to provide an improvements upon my Patents No. 2,082,885, dated June 2, 1937, and No 2,125,918, dated August 9, 1938. In the former patents referred to there is described a process for producing a wood preservative of the nature of a synthetic creosote by the treatment of pitches of various character with hydrogen, using a stated upper limit of substantially 200 atmospheres pressure. Further experiment with the process of said former patents has shown an advantage of greatly increased pressures above those mentioned in said patent. It is therefore an object of the present invention to improve upon the process of said former patents by raising the pressures to any point needed to avoid difficulties found with the process as described in my said former patents. An object of the present invention is the thermal protection and conservation of those fractions responsible for toxicity induction.

As is well known, the induction of toxicity in a mixture of aromatic tar fractions, as for instance a mixture of coal tar fractions, is only attained if during hydrogen action the aromatic nuclei of the starting material is protected against excessive rupture and destruction. Rupture and destruction of the aromatic nuclei results in the production of substantially nontoxic materials or materials that are not toxic in the accepted sense.

Accordingly, the instant process of toxicity induction may be explained as being predicated on, among other things, protecting the aromatic nuclei during hydrogen action. As is well known in the art, protection of the aromatic nuclei against rupture and destruction is accomplished by the proper coordination of the time, temperature and pressure.

It is found that working with a coal tar pitch boiling substantially 12% at 355° C. when the said pitch was treated with hydrogen at a pressure of 200 atmospheres and a temperature of 385° C. for four hours without a catalyst, there was induced about 15 per cent of newly formed fractions falling within the specifications of the desired creosote. It is of great importance to increase the percentage of the formation of desired oil per cycle. To this end it was attempted to secure an increased conversion by increasing the temperature, whereupon it was found that the reverse was the fact, for the reason that the higher temperature caused a portion of the original pitch to form coke and an actually reduced percentage of synthetic creosote resulted.

After a great amount of research and experimentation it was found that the desired result could be had by utilizing the higher temperatures in combination with the use of sufficiently high pressure above the 200 atmospheres heretofore used, which increased pressure may need be as high as, or higher, than 1,000 atmospheres. To the best of my knowledge the phenomenon thus discovered depends upon the following theory.

When the temperature is raised above that described in my former patents, or above substantially 400° C., it is believed that the pitch which in its normal condition has about as much carbon residue as is possible of use with the temperatures and pressures mentioned in my former patents, under the influence of the increased temperatures is partially vaporized and is acted upon in both the liquid and the vapor phase, but the vaporization of a portion of the molten pitch results in increasing the effective carbon residue of pitch remaining liquid in the oven, thus resulting in an excessive formation of coke which clogs the retort and blocks further operation.

Tars apparently react the same as pitches, that is to say, tars when under conditions of the process, wherein temperature and pressure fail to be coordinated as above taught, result in the partial vaporization of said tars to the end that in the unvaporized portion the carbon content has been so increased that the thermal sensitivity results in coking.

However, utilizing pressures considerably in excess of 200 atmospheres even as high as 1,000 atmospheres or higher, when the treatment is carried on at a temperature well above 400° C. no such coking takes place for the reason, as is believed, that the action even under the increased temperature is still carried out in the liquid phase, or at least predominantly so.

In the case of certain pitches it has been found the pressures of from 225 to 500 atmospheres suffice to eliminate coking conditions when using a temperature of 400° C. or above. In short, it has been found that pressure which is sufficiently high to preclude an amount of vaporization that will substantially raise the carbon content in the pitch remaining liquid, to a detrimental point in the oven or bomb will be sufficient to avoid the formation of coke when the temperature even above 400° C. is not sufficient to cause the referred to amount of vaporization at the pressure used. Thus, the present invention provides a process for so co-ordinating temperature and pressure, said temperature being substantially 400° C. or above, and said pressure above 200 atmospheres, that the pressure is sufficient to conserve and thermally protect those fractions responsible for toxicity induction.

After the treatment has been carried out as above outlined, the beneficiated material may be distilled, as for instance, at an upper limit of from 300° to 425° C. or higher to provide the desired wood preservative as a distillate, and the residue if desired, alone, or mixed with fresh pitch to restore the volume, may be again treated in a cyclic manner.

In the event low ends below specification wood preservative are formed, said low ends may be stripped to give conformance to said specification wood preservative, as for instance the following specifications, or others:

WOOD PRESERVING IMPREGNANTS

*Specification*

1. American Wood Preservers' Association:
   *a.* Up to 210° C., not more than 5%
   *b.* Up to 235° C., not more than 25%
2. American Wood Preservers' Association:
   *a.* Up to 210° C., not more than 1%
   *b.* Up to 235° C., not more than 10%
   *c.* Up to 355° C., not less than 65%
3. American Wood Preservers' Association:
   *a.* Up to 235° C., not more than 1½%
   *b.* Up to 300° C., not more than 16½%
   *c.* Up to 355° C., not less than 45%
4. American Wood Preservers' Association:
   *a.* Up to 210° C., not more than 8%
   *b.* Up to 235° C., not more than 35%
5. American Wood Preservers' Association:
   *a.* Up to 210° C., not more than 10%
   *b.* Up to 235° C., not more than 40%
6. American Wood Preservers' Association:
   *a.* Up to 210° C., not more than 5%
   *b.* Up to 235° C., not more than 15%
7. Prussian Railway:
   *a.* Up to 150° C., not more than 3%
   *b.* Up to 200° C., not more than 10%
   *c.* Up to 235° C., not more than 25%
8. National Paint Varnish & Lacquer Association #220:
   *a.* 5% at 162° C.
   *b.* 97% at 270° C.
9. Southern Pine Shingle Stain Oil:
   *a.* 5% at 137° C.
   *b.* 95% at 250° C.
10. Neville Shingle Stain Oil:
   *a.* I. B. P., 150° C.
   *b.* 5% at 205° C.
   *c.* 95% at 292° C.
11. Carbolineum:
   *a.* I. B. P.—270° C.

Instead of providing the wood preservative as a distillate, the entirety of the starting material processed in accordance with the present invention may be used as the wood preservative of enhanced toxic value, lowered coke residue and specific gravity. Low ends outside specified or desired wood preserving range may be stripped to provide conformance.

The starting materials have toxicity induced therein as flowing from controlled action of hydrogen, whereby to provide, among other things, lowered coke residue, specific gravity and viscosity.

*Example 1.*—Coal tar pitch having a Conradson Carbon of above 40 was subjected to treatment with hydrogen in a continuous plant at 200 atmospheres pressure and 425° C. while flowing 20,000 cubic feet of hydrogen per barrel of pitch. The pitch because of its high carbon content finally caused the reaction chamber to plug up with coke. An analysis of the situation dictated the procedure of cutting back the carbon content of said pitch with a low carbon coal tar fraction. In this instance a medium boiling fraction was selected and a sufficient amount was added to the pitch to reduce the mixture to a Conradson carbon of 25. However, this expedient did not entirely remove the difficulty. The pressure was then raised to above 200 atmospheres, other conditions remaining substantially the same, the pitch being used having above 40 Conradson carbon, with the result that coking conditions were eliminated, with conversion substantially above 15%.

After treatment of pitch in this manner, the beneficiated material was distilled to an upper limit of 375° C. to provide the distillate as a wood preservative; the residue resulting from said distillation was mixed with fresh pitch and the beneficiating and distillate cycle repeated without difficulties from coking.

*Example 2.*—A coal tar having a Conradson Carbon content of above 8%, boiling 5% at 210° C. and 35% off at 355° C. was subjected to the action of hydrogen for three hours without a catalyst at a pressure of 200 atmospheres and temperature of 475° C. Coke formation was evident. Another portion of the same tar was then treated under the same conditions with the exception that pressure was increased to 600 atmospheres, the treatment being continued for three hours. No coking resulted and the product showed a lowered Conradson Carbon and boiled 45% at 355° C. providing an oil comparable to a coal tar-creosote solution having enhanced toxic value compared with the starting material with beneficiation substantially in excess of that secured at 200 atmospheres pressure. However, by variation of controls, an oil comparable to a creosote-coal tar solution having a higher coke residue with 40% boiling at 355° C. has been produced.

*Example 3.*—Coal tar, specific gravity of substantially 1.20 was passed through a reaction chamber at 425° C. and in excess of 225 atmospheres pressure while flowing in excess of 2,000 cubic feet of hydrogen or hydrogen-containing gas per barrel of tar. Time of reaction substantially one hour.

Conradson carbon of starting material was 25. The final product had a specific gravity of in the order of 1.10 and Conradson carbon of substantially 12. No coking was observed.

The starting tar of Example 3 had, as noted, a specific gravity of 1.20 and was selected from a group of residual tars formed by removing high boiling solvents therefrom.

All hydrogenating catalysts with or without small addition of acid or halogen derivative are usable, however, catalysts immune, or substantially immune to sulphur poisoning are preferred. As an example may be mentioned the catalysts prepared from the 6th periodic group, as for instance, their oxides and/or sulphides alone or in admixture, in combination with other materials effecting hydrogenation, or not, such as clays, silica, lumps of brick, asbestos, etc.; supported on carriers including gels; in various forms, as for instance, shapes, comminuted or as pellets or extruded lengths.

*Example 4.*—A tar, specific gravity 1.16 and coke residue, specific gravity and viscosity too high for a wood preservative was subjected to the action of hydrogen at 375° C. and 600 atmospheres pressure for 15 minutes. At the end of the 15 minute period the temperature was raised to 440° C. and continued for an additional quarter hour.

The hydrogenated material had a toxicity in excess of its parent material and a lowered coke residue, specific gravity and viscosity that made same usable as a substitute for a creosote-coal tar solution. 4% of low ends were removed to provide conformance in the low boiling range to said type oil.

The present invention is not circumscribed by any definite boiling range of the wood preservatives produced, and as will be immediately apparent, wood preserving oils of wide and varying boiling ranges may be prepared from tars subjected to toxicity including hydrogenation.

Example 3 shows as a starting material, a coal tar having a specific gravity of substantially 1.20. As is well known, average coke oven tars seldom have this specific gravity. Thus the noted tar of 1.20 specific gravity was chosen from a group of residual tars formed by removing fractions therefrom.

An especially attractive form of starting material is a tar or fraction thereof at least once subjected to the refining action of hydrogen. When using as a starting material a tar, or fraction thereof, at least once refined by hydrogen there is the added advantage, among other things that higher temperatures may be used, thus providing an additional increment of desired product.

Minor changes may be made in the steps of the process within the scope of the appended claims without departing from the spirit of the invention.

I claim:

1. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure in excess of 200 atmospheres; protecting aromatic nuclei from excessive rupture and destruction by coordination of time, temperature and pressure, the time being so selected as to provide an oil containing fractions necessary in an oil of the wood preserving type and having not substantially in excess of 10% boiling up to 210° C., nor greater percentages of Conradson carbon or residual materials distilling above 355° C. than is permitted by specifications accepted by the trade for a tar derived wood preservative.

2. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure in excess of 200 atmospheres; protecting aromatic nuclei from excessive rupture and destruction by coordination of time, temperature and pressure, the time being so selected as to provide an oil containing fractions necessary in an oil of the wood preserving type having not substantially in excess of 3% boiling up to 150° C., nor greater percentages of Conradson Carbon or residual materials distilling up to 355° C. than is permitted by specifications accepted by the trade for a tar derived wood preservative.

3. The process of producing wood preservatives more toxic than the starting material from a mixture of high temperature coal tar fractions boiling predominantly in excess of 355° C., having Conradson Carbon and specific gravity too high for use as wood preservative, and containing fractions once subjected to the action of hydrogen, which process comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure in excess of 200 atmospheres; protecting aromatic nuclei from excessive rupture and destruction by coordination of time, temperature and pressure, the time being so selected as to provide a newly formed material of lowered specific gravity and Conradson Carbon, and induced toxicity, and containing toxic fractions necessary in an oil of the wood preservative type, said contained toxic fractions having not more than about 10% boiling up to 210° C., nor greater percentages of Conradson Carbon or residual materials distilling above 355° C. than is permitted by specifications accepted by the trade for a tar derived wood preservative.

4. The process of producing wood preservatives more toxic than the starting material from a mixture of high temperature coal tar fractions boiling predominantly in excess of 355° C., having Conradson Carbon and specific gravity too high for use as a wood preservative, and containing fractions once subjected to the action of hydrogen, which process comprises: subjecting said material to the toxicity-inducing action of hydrogen while maintaining a temperature in excess of 400° C., but not in excess of about 440° C.; thermally protecting and conserving those fractions responsible for toxicity induction by coordinating with said temperature a pressure in excess of 200 atmospheres; protecting aromatic nuclei from excessive rupture and destruction by coordination of time, temperature and pressure, the time being so selected as to provide toxic fractions segregable to provide an acceptable wood preservative having no greater percentages of material boiling below 210° C., Conradson Carbon nor residual material distilling above 355° C. than is permitted by specifications accepted by the trade for a tar derived wood preservative.

5. The process of producing wood preservatives more toxic than the starting material from a mixture of high temperature coal tar fractions boiling predominantly in excess of 355° C., having a Conradson Carbon and specific gravity too high for use as wood preservative, and containing fractions once subjected to the action of hydrogen, which process comprises: subjecting said material to the toxicity-inducing action of hydrogen while maintaining a temperature in excess of 400° C., but not above about 440° C.; thermally protecting and conserving those fractions responsible for toxicity induction by coordinating with said temperature a pressure in excess of 200 atmospheres; protecting aromatic nuclei from excessive rupture and destruction by coordinating with said temperature and pressure a treatment period of about fifteen minutes whereby to provide a newly formed material of lowered specific gravity and Conradson Carbon, and induced toxicity, and containing toxic fractions necessary in an oil of the wood preservative type, said contained toxic fractions having not more than about 10% boiling up to 210° C., nor greater percentages of Conradson Carbon or residual materials distilling above 355° C. than is permitted by specifications accepted by the trade for a tar derived wood preservative.

6. The process of producing wood preservatives more toxic than the starting material from a mixture of high temperature coal tar fractions boiling predominantly in excess of 355° C., having a Conradson Carbon and specific gravity too high for use as wood preservative, and containing fractions once subjected to the action of hydrogen, which process comprises: subjecting said material to the toxicity-inducing action of hydrogen while maintaining a temperature chosen from the range in excess of 400° C., but not higher than about 475° C.; thermally protecting and conserving those fractions responsible for toxicity induction by coordinating with said temperature a pressure chosen from the range between a pressure in excess of 200 atmospheres and as high as 1,000 atmospheres; protecting aromatic nuclei from excessive rupture and destruction by coordinating with said temperature and pressure a treatment period between about fifteen minutes and three hours, the time being so selected as to provide toxic fractions segregable to provide an acceptable wood preservative having no greater percentage of material boiling below 210° C., Conradson Carbon nor residual material distilling above 355° C. than is permitted by specifications accepted by the trade for a tar derived wood preservative.

7. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure in excess of 200 atmospheres; protecting aromatic nuclei from excessive rupture and destruction by coordinating with said temperature and pressure a treatment period between the limits of about fifteen minutes and three hours, the time being so selected as to provide toxic fractions segregable to provide an acceptable wood preservative having no greater percentage of material boiling below 210° C., Conradson Carbon or residual material distilling above 355° C. than is permitted by specifications accepted by the trade for a tar derived wood preservative.

8. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range between a low limit in excess of 400° C., and an upper limit at about 475° C.; thermally protecting and conserving those fractions responsible for toxicity induction by coordinating with said temperature a pressure in excess of 200 atmospheres; protecting aromatic nuclei from excessive rupture and destruction by a coordination of time, temperature and pressure, the time being so selected as to provide toxic fractions segregable to provide an acceptable wood preservative having no greater percentage of material boiling below 210° C., Conradson Carbon nor residual material distilling above 355° C. than is permitted by specifications accepted by the trade for a tar derived wood preservative.

9. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure chosen from the range between a pressure in excess of 200 atmospheres and as high as 1,000 atmospheres; protecting aromatic nuclei from excessive rupture and destruction by coordinating with said temperature and pressure a treatment period selected between the limits of about fifteen minutes and three hours, the time being so selected as to provide toxic fractions segregable to provide an acceptable wood preservative having no greater percentage of material boiling below 210° C., Conradson Carbon nor residual material distilling above 355° C. than is permitted by specifications accepted by the trade for a tar derived wood preservative.

10. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range between a temperature in excess of 400° C., but not above about 440° C.; thermally protecting and conserving those fractions responsible for toxicity induction by coordinating with said temperature a pressure in excess of 200 atmospheres; protecting aromatic nuclei from excessive rupture and destruction by coordinating with said temperature and pressure a treatment period of in the order of about fifteen minutes whereby to provide toxic fractions segregable to provide an acceptable wood preservative having no greater percentage of material boiling below 210° C., Conradson Carbon nor residual material above 355° C. than is permitted by specifications accepted by the trade for a tar derived wood preservative.

11. The process of producing wood preservatives more toxic than the starting material from a mixture of high temperature coal tar fractions boiling predominantly above 355° C. and having Conradson Carbon too high for said use, which comprises: subjecting said material to the toxicity-inducing action of hydrogen while maintaining a temperature chosen from the range in excess of 400° C.; thermally protecting and conserving those fractions responsible for toxicity induction by coordinating with said temperature a pressure in excess of about 1,000 atmospheres; protecting aromatic nuclei from excessive rupture and destruction by coordination of time, temperature and pressure, the time being so selected as to provide newly formed material of lowered specific gravity and Conradson Carbon, and induced toxicity, and containing toxic fractions necessary in an oil of the wood preservative type, said contained toxic fractions having not more than about 10% boiling up to 210° C., nor greater percentages of Conradson Carbon or residual material boiling above 335° C. and is permitted by specifications accepted by the trade for a tar derived wood preservative.

12. The process of producing wood preservatives more toxic than the starting material from a mixture of high temperature coal tar fractions boiling predominantly above 355° and having Conradson Carbon too high for said use, which comprises: subjecting said material to the toxicity-inducing action of hydrogen while maintaining a temperature chosen from the range between a temperature in excess of 400° C., and about 475° C.; thermally protecting and conserving those fractions responsible for toxicity induction by coordinating with said temperature a pressure in excess of 200 atmospheres; protecting aromatic nuclei from excessive rupture and destruction by coordinating with said temperature and pressure a treatment period in the order of about fifteen minutes whereby to provide a newly formed material of lowered specific gravity and Conradson Carbon, and induced toxicity, and containing toxic fractions necessary in an oil of the wood preservative type, said contained toxic fractions having not more than about 10% boiling up to 210° C., nor greater percentages of Conradson Carbon or residual materials distilling above 355° C. than is permitted by specifications accepted by the trade for a tar derived wood preservative.

JACQUELIN E. HARVEY, Jr.